United States Patent [19]

Tomisawa

[11] Patent Number: 4,763,627
[45] Date of Patent: Aug. 16, 1988

[54] LEARNING AND CONTROL APPARATUS FOR ELECTRONICALLY CONTROLLED INTERNAL COMBUSTION ENGINE

[75] Inventor: Naoki Tomisawa, Takasaki, Japan
[73] Assignee: Japan Electronic Control Systems, Co., Ltd., Japan
[21] Appl. No.: 880,556
[22] Filed: Jun. 30, 1986
[51] Int. Cl.[4] ............................................. F02B 3/00
[52] U.S. Cl. ................................. 123/440; 123/480
[58] Field of Search ............. 123/339, 440, 489, 425, 123/417, 480

[56] References Cited

U.S. PATENT DOCUMENTS 4,646,697  3/1987  Grob ................................. 123/425
4,669,439  6/1987  Mamiya ............................. 123/440

Primary Examiner—Ronald B. Cox
Attorney, Agent, or Firm—Lowe, Price, LeBlanc, Becker & Shur

[57] ABSTRACT

A learning and control apparatus for an electronically controlled internal combustion engine having such an object to be controlled as a fuel injection valve for controlling the air-fuel ratio in an air-fuel mixture or an idle speed control valve for controlling the idle rotation number of the engine wherein a pulse duty signal corresponding to a basic control value is set according to engine driving states. The basic control value is corrected by adding an appropriate correction value to the basic control value. Feedback control is carried out so that the actual controlled value is made to follow the aimed control value, and a learning correction quantity is computed by learning said feedback control so that the feedback control amount is set as small as possible. Driving region judging means judges the driving region stored learning correction quantity in a memory map corresponding to the detected actual driving state with such a hysteresis that at least one of the driving region-defining lattice axes in the memory map is shifted by a predetermined value according to the direction of change of the parameter of the engine driving state, thereby when the engine is driven in the driving state near the boundary that is lattice axes, between adjacent driving regions having a large difference between respective learning correction quantities no hunting phenomenon of the control quantity in engine driving and stable control characteristics can be maintained.

13 Claims, 8 Drawing Sheets

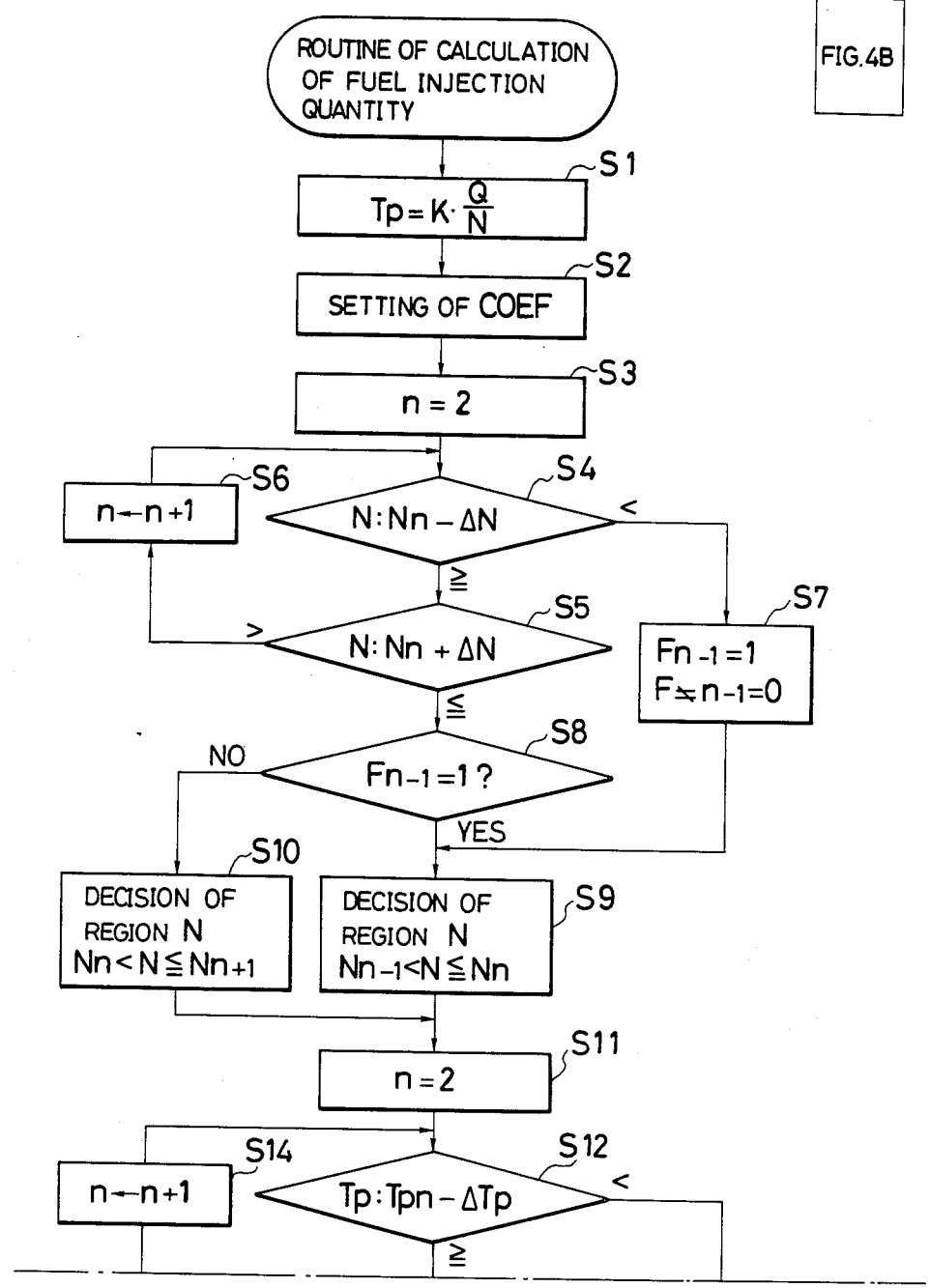

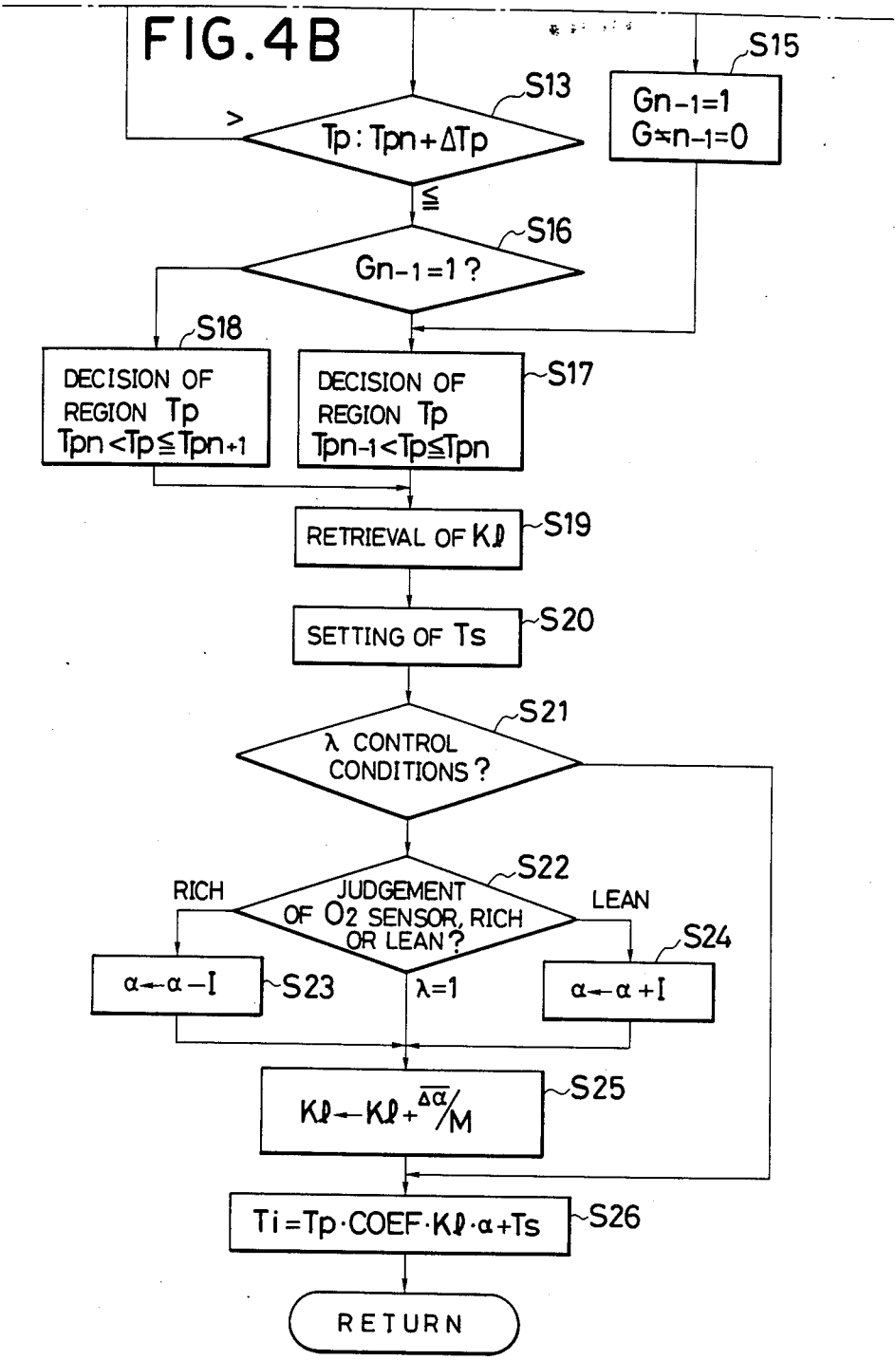

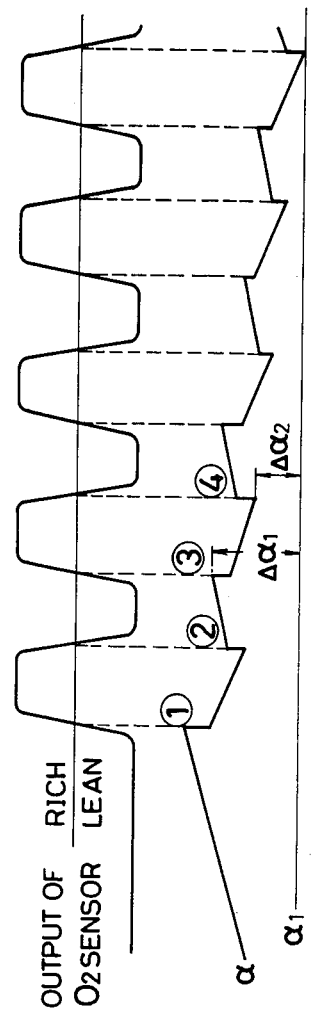

LEARNING AND CONTROL APPARATUS FOR ELECTRONICALLY CONTROLLED INTERNAL COMBUSTION ENGINE

BACKGROUND OF THE INVENTION (1) Field of the Invention

The present invention relates to a learning and control apparatus for feedback control of an air-fuel ratio, an idle rotation number or the like in an electronically controlled internal combustion engine.

(2) Conventional Techniques

As the conventional learning and control apparatus for an internal combustion engine, there can be mentioned an apparatus for learning and control of an air-fuel ratio, as disclosed in Japanese Patent Application Laid-Open Specification No. 203828/74, and an apparatus for learning and control of an idle rotation number, as disclosed in Japanese Patent Application Laid-Open Specification No. 211738/84.

The conventional techniques will now be described with reference to an apparatus for learning and control of a base air-fuel ratio, in which the air-fuel ratio is feedback-controlled to a theoretical air-fuel ratio as an aimed control value in an internal combustion engine provided with an electronically controlled fuel injection apparatus.

An electronically controlled fuel injection valve is opened by a driving pulse signal (injection pulse) given synchronously with the rotation of an engine and while the valve is opened, a fuel is injected under a predetermined pressure.

Accordingly, the injection quantity of the fuel depends on the period of opening of the valve, that is, the injection pulse width. Assuming that this pulse width is expressed as Ti and is a control signal corresponding to the injection quantity of the fuel, Ti is expressed by the following equations:

$$Ti = Tp \times COEF \times \alpha + Ts \text{ and } Tp = K \times Q/N$$

wherein Tp stands for the injection pulse width corresponding to the basic injection quantity of the fuel, which is called "basic fuel injection quantity" for convenience, K stands for a constant, Q stands for the flow quantity of air sucked in the engine, N stands for the rotation speed of the engine, COEF stands for various correction coefficients for correcting the quantity of the fuel, which is expressed by the following formula:

$$COEF = 1 + Ktw + Kas + Kai + Kmr + Ketc$$

in which Ktw stands for a coefficient for increasing the quantity of the fuel as the water temperature is lower, Kas stands for a correction coefficient for increasing the quantity of the fuel at and after the start of the engine, Kai stands for a correction coefficient for increasing the quantity of the engine after a throttle valve arranged in an intake passage of the engine is opened, Kmr stands for a coefficient for correcting the air fuel mixture, and Ketc stands for other correction coefficient for increasing the quantity of the fuel, $\alpha$ stands for an air-fuel ratio feedback correction coefficient for the feedback control ($\lambda$ control), described hereinafter, of the air-fuel ratio of the air-fuel mixture, and Ts stands for the quantity of the voltage correction for correcting the change of the flow quantity of the fuel injected by the fuel injection valve, which is caused by the change of the voltage of a battery.

In short, the desired injection quantity of the fuel is obtained by multiplying the basic fuel injection quantity Tp by various correction coefficients COEF, and when a difference is brought about between the aimed control value to be attained by the control and the actual controlled value, this difference is multiplied by $\alpha$ to effect the feedback control and the correction for the power source voltage is added to the feedback control.

This air-fuel ratio feedback correction control is disclosed in, for example, U.S. Pat. No. 4,284,050, U.S. Pat. No. 3,483,851 and U.S. Pat. No. 3,750,632.

However, in this air-fuel ratio feedback control, for example, when one constant driving region is greatly changed to a different constant driving region, if the base air-fuel ratio in this different stationary driving region is greatly deviated from $\lambda = 1$ ($\lambda$ stands for an actual air-fuel ratio), it takes too long a time to perform the feedback control (proportion and integration control . . . PI control) of the change of the base air-fuel ratio generated by this deviation to $\lambda = 1$. More specifically, even though the base air-fuel ratio has been obtained from the specific injection quantity $Tp \times COEF$ and the deviation of this air-fuel ratio from the theoretical air-fuel ratio has been corrected by the PI control based on $\alpha$, since the base air-fuel ratio is greatly changed, the base air-fuel ratio is controlled to a value greatly different from $\lambda = 1$ if $Tp \times COEF$ used up to this time is still used, and the feedback correction by similar PI control should be performed and it takes a long time to correct the base air-fuel ratio to $\lambda = 1$ by the feedback correction.

A control system in which the above-mentioned disadvantage is eliminated by learning the control quantity controlled by the system and increasing the respondency of the air-fuel ratio control in the same driving state has been proposed by us in Japanese Patent Application Laid-Open Specifications No. 203828/74 and No. 203829/74 and U.S. patent application Ser. No. 604,025, filed Apr. 26, 1984, now U.S. Pat. No. 4,615,319, issued Oct. 7, 1986.

According to this control system, learning control of the air-fuel ratio feedback control is first carried out. More specifically, in the air-fuel ratio feedback control region, if the base air-fuel ratio is deviated from the aimed air-fuel ratio $\lambda t$, since the feedback correction coefficient $\alpha$ is increased for compensating this gap during the process of transfer, the driving state at this time and $\alpha$ are detected, and a learning correction coefficient Kl based on this $\alpha$ is determined and stored. When the same driving state is brought about, the base air-fuel ratio is corrected to the aimed air-fuel ratio $\lambda t$ with a good respondency by the stored learning correction coefficient Kl. Storing of the learning correction coefficient Kl is performed for all of engine-driving state areas of a predetermined range formed by lattice division of a map of RAM according to the rotation speed of the engine and the engine-driving conditions such as the load.

More specifically, the map of the learning correction coefficient Kl corresponding to the rotation speed of the engine and the driving conditions of the engine such as the load is formed on RAM, and when the injection quantity Ti is calculated, the basic injection quantity Tp is corrected by Kl as shown by the following equation:

$$Ti = Tp \times COEF \times Kl \times \alpha + Ts \qquad (1)$$

Learning of Kl is advanced according to the following procedures.

(i) The engine-driving state in the constant state and the median $\alpha c$ of control of $\alpha$(the mean value of a plurality of values Kl at the time of reversion of increase and decrease of the output signal of an $O_2$ sensor) are detected.

(ii) The value Kl(old) heretofore learned, corresponding to the engine-driving state, is retrieved.

(iii) The value of Kl(old)+$\Delta\alpha$/M is determined from c and Kl(old), and the storage is renewed with the obtained value (learned value) being as new Kl(new).

Incidentally, $\Delta\alpha$ stands for the deviation from the standard value $\alpha 1$ and expressed by $\Delta\alpha=\alpha-1$. The standard value $\alpha 1$ ordinarily set at 1.0 as the value corresponding to $\lambda=1$. M is a constant larger than 1.

An apparatus for learning and control of the idle rotation speed is applied to the case where an idle control valve is disposed in an auxiliary air passage bypassing a throttle valve and the opening degree of this idles control valve is adjusted to control the idle rotation speed. When the basic opening degree of the idle control valve corresponding to the aimed idle rotation speed for each temperature of cooling water for the engine is feedback-controlled while comparing the aimed idle rotation speed with the actual idle rotation speed, a map of learning correction quantities is formed according to the temperature of cooling water as a parameter of the engine driving state, the deviation of the feedback correction quantity from the base value is learned to correct the learning correction quantity, and the basic opening degree of the valve is corrected by this learning correction quantity to stabilize the control.

According to the above-mentioned learning and control system, writing in the map for storing learning correction quantities performed without interpolation. This is because the speed of advance of learning is reduced since the learning correction quantities to be written by means of the manner of interpolation is influenced by the quantities stored in adjacent engine driving region.

In this case, however, in the driving state near the boundary between a driving region having a high degree of advance of learning (hereinafter referred to as "learned region") and a region having a low degree of advance of learning (hereinafter referred to as "unlearned region"), the control quantity is varied because the difference of the learning correction quantity between said two regions is large, and therefore, no stable control capacity can be obtained.

It is a primary object of the present invention to eliminate needless or harmful variations of the control state in the vicinity of the boundary between adjacent regions where learning correction quantities are stored.

Another object of the present invention is to eliminate needless or harmful variations of the learning state in the vicinity of the boundary between the adjacent regions where learning correction quantities are stored.

Another object of the present invention is to provide such a hysteresis that lattice axes in a memory map being stored learning correction quantities therein are shiftable according to the direction of change of the parameter of the engine driving state. The lattice axes divide a memory map into plural engine driving regions. When one of the learning correction quantities is retrieved from the memory map, the corresponding engine driving region is restricted by the shifted lattice axes with the hysteresis for obtaining the above described two objects of the present invention.

In the present invention, the lattice axes may be shiftable in such a direction that the engine driving region where the present learning correction quantity is retrieved is expanded when retrieving the engine driving region is to be in a tendency to change the present region to the adjacent region.

In the present invention, the lattice axes may also shiftable in such a direction that the engine driving condition is increased when the learning correction quantity is retrieved according to increasing of the engine driving state.

More specifically, according to the present invention, in order to attain the above objects, the learning and control apparatus of the present invention comprises the following means (A)through (I), as shown in FIG. 1.

(A)basic control quantity setting means for setting a basic control quantity corresponding to an aimed control value of the internal combustion engine, (B)reloadable memory means for storing lattice axes for dividing the engine driving state into a plurality of regions by a parameter of the engine driving state and learning correction quantities for correcting said basic control quantity for the respective regions restricted by said lattice axes, (C)learning correction quantity retrieving means for retrieving the learning correction quantity of the corresponding region from said memory means based on the actual engine driving state, (D)feedback correction quantity setting means for comparing the aimed control value with the actual value and setting a feedback correction quantity for correcting said basic control value by increasing or decreasing the feedback correction quantity by a predetermined quantity so that the actual value is brought close to the aimed control value, (E)control quantity computing means for computing a control quantity from the basic control quantity set by said basic control quantity setting means, the learning correction quantity retrievied by said learning correction quantity set by said feedback correction quantity setting means, (F)control means operated according to said control quantity to control the aimed control value, (G)learning correction quantity correcting means for learning a mean value of the deviation of the feedback correction quantity from the basic value and correcting and rewriting the learning correction quantity corresponding to the region of the existing engine driving state in such a direction as reducing said mean value, (H)driving state change direction judging means for judging the direction of change of the parameter of the engine driving state, and (I)driving region judging means for judging the driving region in which the learning correction quantity retrieved from the memory means by said learning correction quantity retrieving means is stored, with a certain hysteresis produced by shifting the driving region-defining lattice axes in a corresponding different direction with respect to each of two opposite directions of change of the parameter of the engine driving state.

According to the general construction of the present invention, the basic control quantity setting means sets a basic control quantity corresponding to an aimed control value of an air-fuel ratio, an idle rotation speed or the like, for example, according to a predetermined calculation formula or by retrieving, the learning correction quantity retrieving means retrieves a learning correction quantity of a region corresponding to the actual engine driving state from memory means, and the feedback correction quantity setting means compares the aimed control value with the actual value and sets the feedback correction quantity by increasing or decreasing the feedback correction quantity by a predetermined quantity, for example, based on the proportional integration control, so that the actual value is brought close to the aimed control value. The control quantity computing means computes the control quantity by correcting the basic control quantity by the learning correction quantity and also by the feedback correction quantity, and according to this control quantity, the control means is operated to control, for example, the fuel injection quantity or the quantity of auxiliary air for idling, and to control the air-fuel ratio or the idle rotation speed.

The memory means stores the engine driving state in a plurality of regions defined by at least 1 or 2 parameters in the state where the learning correction quantity is reloadable. In retrieving the learning correction quantity, the direction of change of the parameter of the engine driving state is judged by the driving state change direction judging means, and when the parameter is changed in one direction or in the opposite direction, the positions lattice axes defining the driving region having the learning correction quantity stored therein are shifted in the corresponding defferent direction and in this state, the driving region where said retrieving is effected is judged and the learning correction quantity is retrieved based on the result of said judgement.

In the above-mentioned system, even when the driving state is in the vicinity of the lattice axes, hunting of the control quantity, which is due to the high digree of difference between the learning correction quantities retrieved from adjacent driving regions, can be prevented, and the center of the region where learning is performed can be made substantially in agreement with the center of the driving region corrected by the judgement. Accordingly, a good learning control capacity can be maintained.

The above-mentioned object and structure of the present invention will become more apparent from the following description concerning embodiments.

BRIEF DESCRIPTION OF THE DRAWINGS

FIGS. 4, 4A and 4B are flow charts illustrating control for an air-fuel ratio of intake mixture of one embodiment of the present invention.

FIG. 6 is a time chart illustrating the relation between the output of an $O_2$ sensor and the feedback correction quantity.

DETAILED DESCRIPTION OF THE PREFERRED EMBODIMENTS

The present invention will now be described with reference to an embodiment in which the learning and control apparatus of the present invention is applied to the system of feedback control of the air-fuel ratio in an internal combustion engine provided with an electronically controlled fuel injection apparatus.

Figure 1:
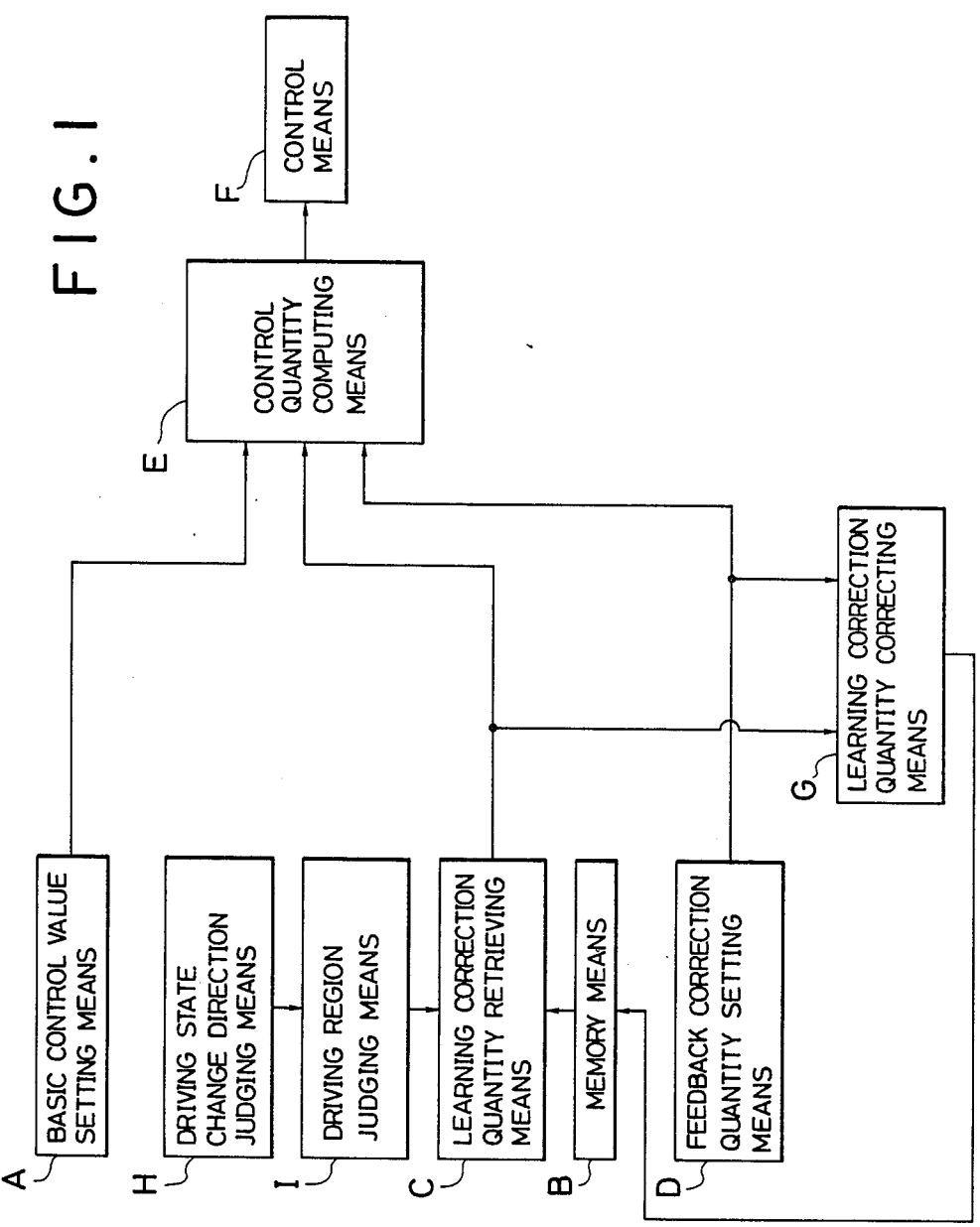
FIG. 1 is a block diagram illustrating the general structure and function of the present invention.
Figure 2:
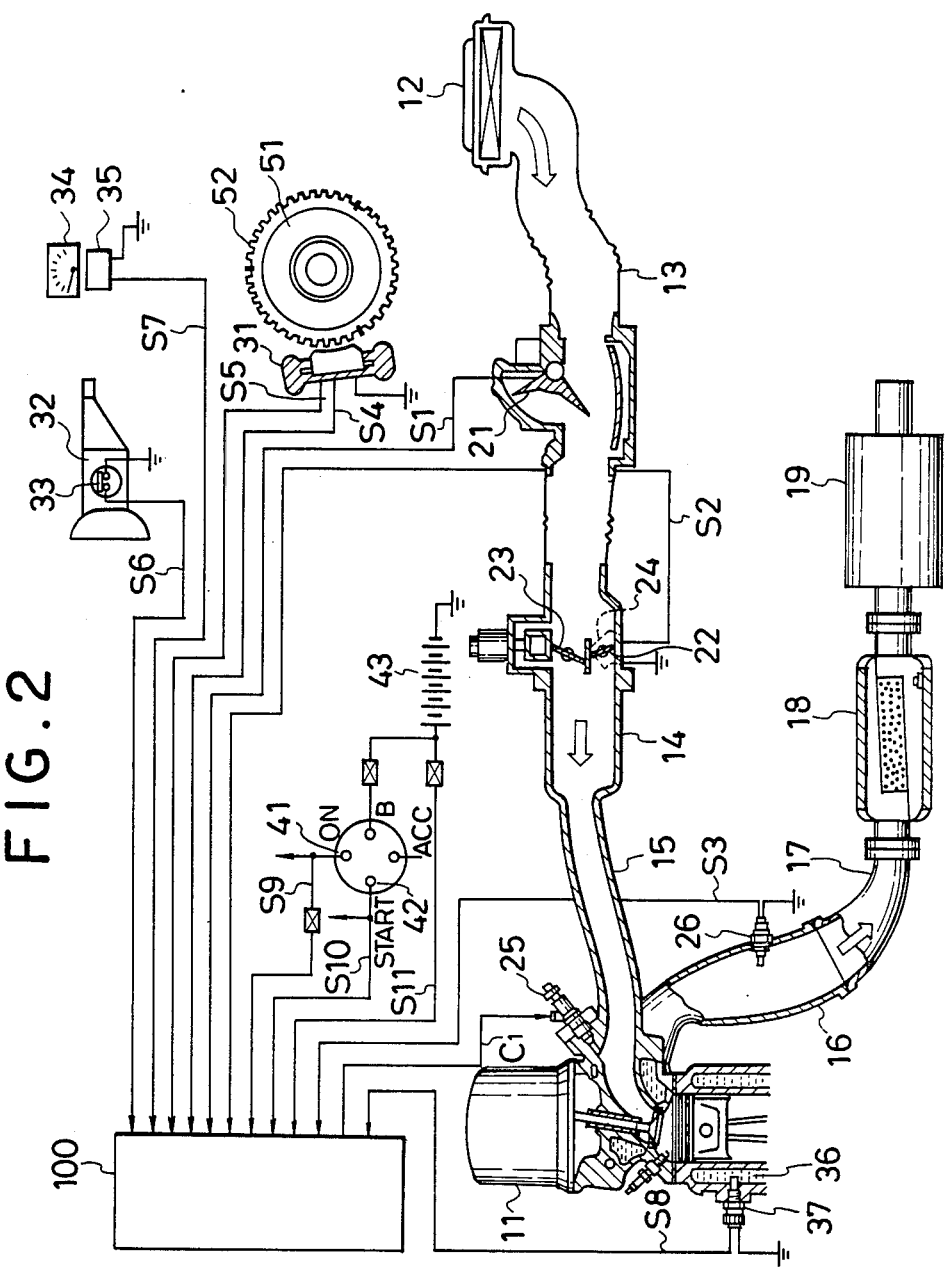
FIG. 2 is a schematic structual view showing one embodiment of the present invention.

Referring to FIG. 2, air is sucked in an engine 11 through an air cleaner 12, an intake duct 13, a throttle chamber 14 and an intake manifold 15 and an exhaust gas is discharged through an exhaust manifold 16, an exhaust duct 17, a ternary catalyst 18 and a muffler 19.

An air flow meter 21 is arranged in the intake duct 13 to put out a signal S1 of a flow quantity Q of intake air in the engine. The air flow meter 21 may be a hot wire type air flow meter. In the throttle chamber 14, a primary side throttle valve 22 interconnected with an accelerator pedal (not shown) and a secondary side throttle valve 23 are arranged to control the intake air flow quantity Q. A throttle sensor 24 of the variable resistor type is attached to a throttle shaft of the primary side throttle valve 22 to put out an electric current signal S2 corresponding to a change of the electric resistance corresponding to the turning angle, that is, the opening degree, of the throttle valve 22. An idle switch which is turned on when the throttle valve 22 is fully closed is mounted on the throttle sensor 24. A fuel injection valve 25 mounted on the intake manifold 15 or an intake port of the engine 11 is an electromagnetic fuel injection valve which is opened on actuation through a solenoid and is closed on deenergization. Namely, the valve 25 is actuated and opened through the solenoid by a driving pulse signal C1 to inject and supply into the engine a fuel fed under pressure from a fuel pump (not shown).

An $O_2$ sensor 26 acting as means for detecting the concentration of an exhaust component is arranged in the exhaust manifold 16. The $O_2$ sensor 26 is a known sensor which puts out a voltage signal S3 corresponding to the ratio of the oxygen concentration in the exhaust gas to air and the electromotive force of which is abruptly changed when an air-fuel mixture is burnt at the theoretical air-fuel ratio (see FIG. 6). Accordingly, the $O_2$ sensor is means for detecting the air-fuel ratio of the air-fuel mixture. The ternary catalyst 18 is a catalystic device for oxidizing or reducing CO, HC and NOx in the exhaust gas component at a high efficiency at an air-fuel ratio close to the theoretical air-fuel ratio of the air-fuel mixture to convert them to harmless substances.

These air flow meter 21, throttle sensor 24 and $O_2$ sensor 26 constitute main parts of means for detecting the driving state of the engine and detection signals S1 through S3 of said detecting means are put out into a control unit 100. The means for detecting the driving state of the engine, which puts out these detection signals to the control unit 100, comprises, in addition to the above-mentioned members, a crank angle sensor 31, a neutral switch 33 mounted on a transmission 32, a car speed sensor 35 mounted on a speed meter 34 of a car, and a water temperature sensor 37 for detecting the temperature of cooling water in a water jacket 36 for cooling the engine or cooling water in a thermostat housing of the cooling water circulation system. The crank angle sensor 31 is arranged to detect a rotation speed N of the engine and a crank angle (piston position), and a signal disc plate 52 is mounted on a crank pulley 51 and a crank angle sensor 31 puts out a reference signal S4 by, for example, every 180° in the crank angle in case of a 4-cylinder engine or by every 120° in the crank angle in case of a 6-cylinder engine and a position signal S5 by, for example, every 1° in the crank angle according to teeth formed on the periphery of the plate 52. When the transmission 32 is set at the neutral position, the neutral switch 33 detects this and puts out a signal S6. The car speed sensor 35 detects the car speed and puts out a car speed signal S7. The water temperature sensor 37 puts out a voltage signal S8 changing according to the change of the temperature of cooling water corresponding to the temperature of the engine.

The means for detecting the driving state of the engine further comprises an ignition switch 41 and a start switch 42. The ignition switch 41 is a switch for applying a voltage of a battery 43 to an ignition device and putting out an on-off signal S9 to the control unit 100. The start switch 42 is a switch which is turned on when a starter motor is driven to start the engine and which puts out an on-off signal S10. The terminal voltage of the battery 43 is put out to the control unit 100 by a signal S11.

The detection signals S1 through S11 emitted from the respective elements of the means for detecting the driving state of the engine are put into the control unit 100 where the operation processing is carried out to put out a signal C1 of an optimum injection pulse width to the fuel injection valve and obtain a fuel injection quantity giving an optimum air-fuel ratio.

Figure 3:
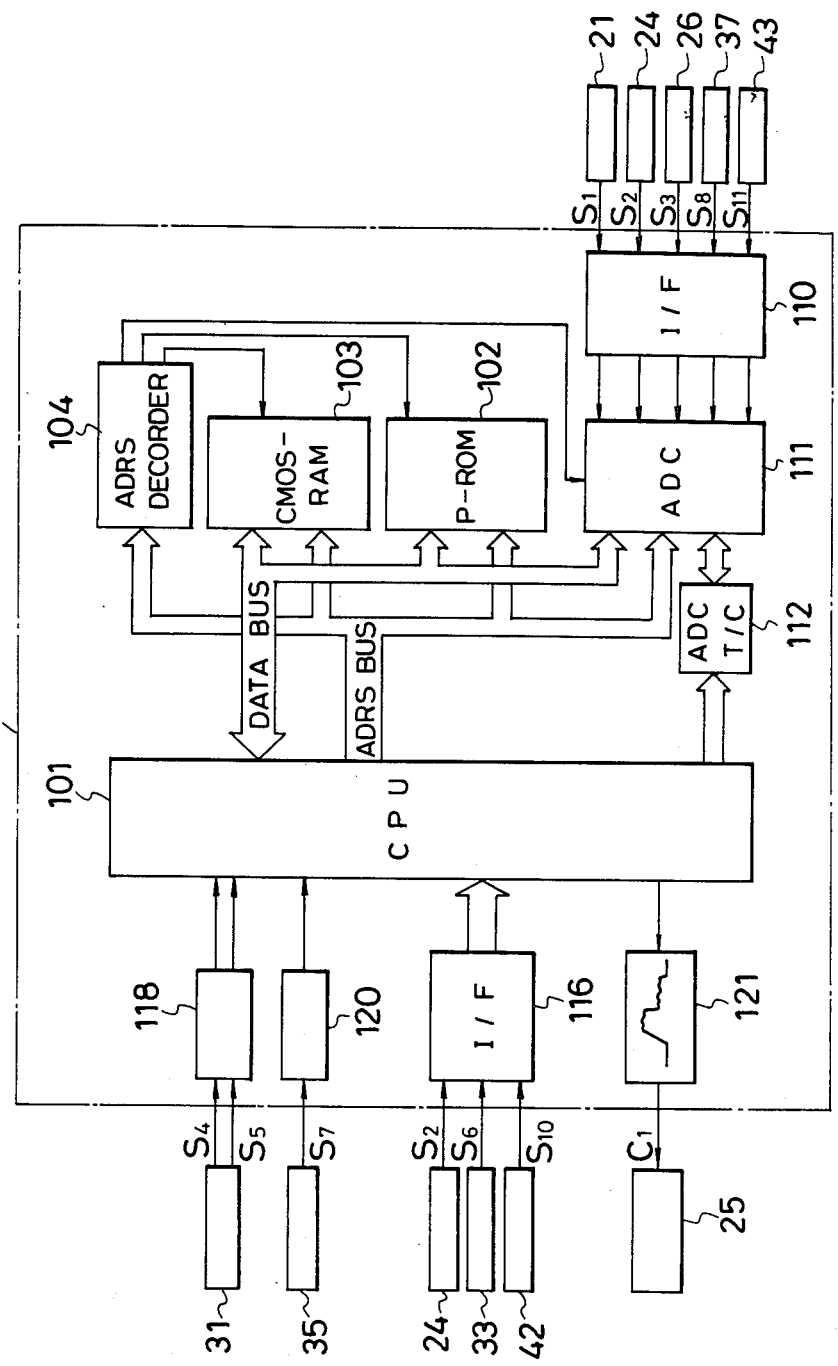
FIG. 3 is a block diagram showing the control unit in FIG. 2.

The control unit 100 comprises CPU 101, P-ROM 102, CMOS-RAM 103 for the learning control of the air-fuel ratio and an address decoder 104, as shown in FIG. 3. A back-up power source circuit is used for RAM 103 to retain the content of the memory after the ignition switch 41 has been turned off.

As analogue input signals to be put in CPU 101 for the control of the fuel injection quantity, there can be mentioned the signal S1 of the intake air flow quantity Q from the air flow meter 21, the throttle opening degree signal S2 from the throttle sensor 24, the water temperature signal S8 from the water temperature sensor 37, the signal S3 of the oxygen concentration in the exhaust gas from the $O_2$ sensor 26 and the battery voltage signal S11. These signals are put in CPU 101 through an analogue input interface 110 and an A/D converter 111. The A/D converter 111 is controlled by CPU 101 through an A/D conversion timing controller 112.

As digital input signals, there can be mentioned the idle switch signal S2 which is turned on when the throttle valve 22 is fully closed, and on-off signals S10 and S6 supplied from the start switch 42 and the neutral switch 33. These signals are put in CPU 101 by way of a digital input interface 116.

Furthermore, for example, the reference signal S4 and position signal S5 from the crank angle sensor 31 are put in CPU 101 through a one-shot multichip circuit 118. Moreover, the car speed signal S7 from the car speed sensor 35 is put in CPU 101 through a wave shaping circuit 120.

The output signal from CPU 101 (driving pulse signal to the fuel injection valve 25) is supplied to the fuel injection valve 25 through a current wave control circuit 121.

CPU 101 controls the fuel injection quantity by performing input-output operations and computing processings according to a program (stored in ROM 102) based on a flow chart shown in FIG. 4.

The functions of the basic control quantity (basic fuel injection quantity) setting means, the learning correction quantity (coefficient) retrieving means, the feedback correction quantity (coefficient) setting means, the control quantity (fuel injection quantity) computing means, the learning correction quantity (coefficient) correcting means, the driving state change direction judging means and the driving region judging means are exerted according to the above-mentioned program.

The operations will now be described with reference to the flow chart of FIG. 4.

Referring to FIG. 4, at step 1 (S1 in the drawings; the same will apply hereinafter), the base fuel injection quantity $T_p$ ($=K\,Q/N$) is calculated from the flow quantity Q of sucked air obtained by a signal of the air flow meter 21 and the rotation number N of the engine obtained by a signal of the crank angle sensor 31. This portion corresponds to the basic control value setting means.

At step 2, various correction coefficients COEF are set according to need.

Figure 5:
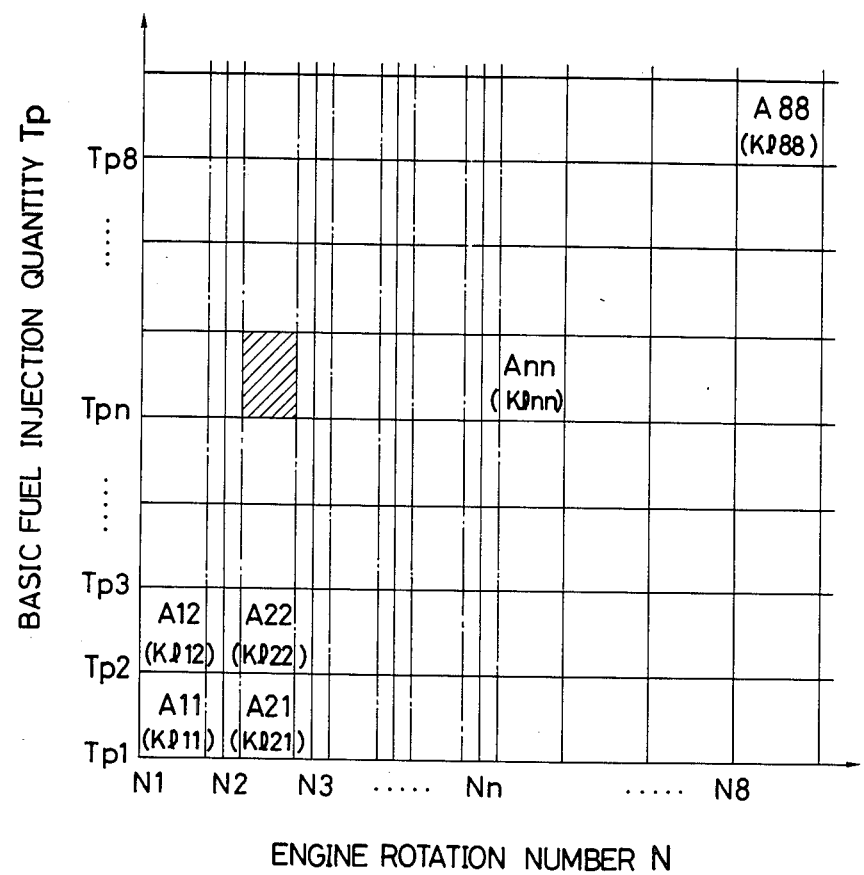
FIG. 5 is a diagram showing a memory map of the learning correction coefficient.

At step 3, as shown in FIG. 5, the affix number n of lattice axes of the engine rotation number N, which is one parameter defining the driving region where the learning correction coefficient Kl is stored, for example, lattice axis N1 through N8, is initially set at minimum value 2 for searching the actual engine rotation speed region by incrementing n by 1. incidentally, it is assumed for the benefit of easy understanding that, the basic fuel injection quantity $T_p$ is a constant value between $T_{pn}$ and $T_{p(n+1)}$. Then the routine goes to step 4 and the actual rotation speed N is compared with the value $N_2-N$ obtained by subtracting a predetermined value N (for example, 50 rpm) from the rotation number N2 of the set lattice axis.

In case of $N \geq N_2 - \Delta N$, the routine goes to step 5, the rotation number N is compared with the value $N_2 + \Delta N$ obtained by adding the predetermined value $\Delta N$ to the rotation number N2.

When $N > N_2 + \Delta N$ is judged at step 5, the routine goes to step 6 and the value of n is increased by 1. Then, the routine returns to step 4, the actual rotation number N is compared with the value obtained by subtracting $\Delta N$ from the rotation number N3 corresponding to the value 3 obtained by addition of 1.

When $N < N_2 - \Delta N$ is judged by the comparison made at step 4, the routine goes to step 7, and the flag $F_{n-1} = F1$ of the region of N corresponding to $N1 < N \leq N2$ is set at 1 and all the flags $F = n - 1$ corresponding to other regions are reset at 0.

Then, the routine goes to step 9, and of driving regions where the learning correction coefficient Kl is retrieved, the region of the rotation number N is judged as the region of $N1 < N \leq N2$.

When $N \leq N_2 + \Delta N$ is judged by the comparison at step 5, the routine goes to step 8 and it is judged whether or not the flag F1 corresponding to $N1 < N \leq N2$ is 1. In case of "Yes", the routine goes to step 9 and the region of the rotation number N is judged as the region of $N1 < N \leq N2$. In case of "No", the routine goes to step 10 and the region of the rotation number N is judged as the region of $N2 < N \leq N3$. When $N > N_n + \Delta N$ is judged at step 5 and $N > N - \Delta N$ is judged at step 4, the routine runs around in a short circuit through steps 4 to 6 while n is increased by 1 in every time until the routine goes to the step 7 or step 8 and the decision of region N is effective at step 9 or step 10 to find n.

The above-mentioned method for deciding the region N will now be described with reference to FIG. 5. A strip judgment region interposed between the value obtained by subtraction of $\Delta N$ and the value obtained by addition of $\Delta N$ is set for each lattice Nn (n=2-8) defining the rotation number, and at steps 4 and 5, it is judged whether or not the region of the present value N is included in this strip region. If the region of the present value N is included, for example, in the region of $N2+\Delta N<N3-\Delta N$, hatched in the drawings, which is outside the strip region, the routine goes to step 7 from step 4 in the state of n=3 and the flag F2 is set at 1, and at step 9 it is judged that the region N is in the region of $N2<N\leq N3$.

If the rotation number N is decreased from this state into the region of $N2-\Delta N\leq N\leq N2+\Delta N$, the routine goes to step 8 from step 5 in the state of n=2. Since F2 was judged as 1 at the preceding flow, $F1\neq 1$ is judged at step 8 and the answer of the step 8 is "No". Accordingly, the routine goes to step 10 and it is judged that the region is included in the region of $N2<N\leq N3$, as in the preceding flow. When the rotation number N is further reduced to $N<N2-\Delta N$, the routine goes to step 7 from step 4 in the state of n=2, and F1 is set at 1. Then, the routine goes to step 9 and it is newly decided that the region N is in $N1<N\leq N2$.

More specifically, in the case where the rotation number N is decreased, the lower limit rotation number lattice axis deciding the region where the learning correction coefficient is retrieved is set at or shifted to a value obtained by subtracting the predetermined value $\Delta N$ from the smaller value among the lattice axes of the rotation number defining the region where the learning correction coefficient to be retrieved is stored, whereby a hysteresis in the region-expanding direction is produced.

When the rotation number N is increased from the hatched region in FIG. 5 and is shifted to a strip region of $N3-\Delta N \leq N\leq N3+\Delta N$, the routine goes to step 8 in the state of n=3. Since F2 is judged as being equal to 1 at step 7 in the preceding flow, the answer is "Yes" and the routine goes to step 9, and it is judged that the region N is in $N2<N\leq N3$.

When the rotation number is further increased to $N>N3+\Delta N$, the routine goes to step 4 after n=4 is attained at step 6. Because of $N<N4-\Delta N$, F3 is set at 1 at step 7, and the routine goes to step 9 and it is newly decided that the region N is in $N3<N\leq N4$.

More specifically in the case where the rotation number N is increased, the lattice axis having upper rotation number deciding the retrieving region is set at or shifted to a value obtained by adding the predetermined value $\Delta N$ to the larger value among the lattice axes of the memory region, whereby a hysteresis in the region-expanding direction is produced in the case where the rotation number is increased as in the case where the rotation number is decreased.

By the function of setting the flag $Fn-1$ at step 7 and judging the flag $F_{n-1}$ at step 8, it can be judged whether the rotation number N is being increased or decreased in the opposite directions of change of the parameter of the engine driving state, and therfore, the function of steps 7 and 8 corresponds to the driving stage change direction judging means and the function of steps 3 through 6, 9 and 10 corresponds to the driving region judging means.

Also with respect to the basic fuel injection quantity Tp, which is another parameter defining the driving region in which the learning correction coefficient Kl is stored, the region where Kl is retrieved is determined in the same manner as described above with reference to the rotation number N.

Figure 7A:
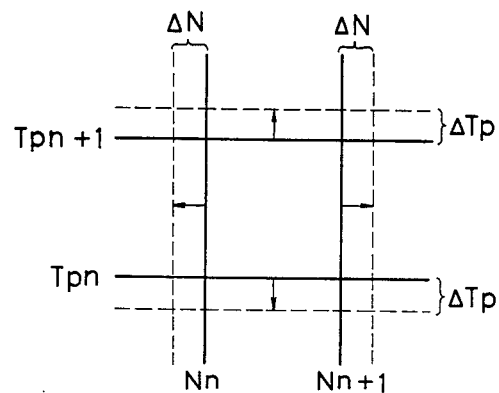
FIG. 7A is a memory map diagram illustrating an embodiment of the learning control system of the present invention.

More specifically, at steps 12 and 13, it is judged whether or not the base fuel injection quantity Tp is in a strip region between the value obtained by subtraction of the predetermined value $\Delta Tp$ from the lattice axis Tpn and the value obtained by addition of $\Delta Tp$ to Tpn, and at step 15 the flag $Gn-1$ is set and at step 16 the flag $Gn-1$ is judged. Thus, the region Tp is decided at steps 17 and 18. Therefore, judging the driving region restricted lattice axes of N and Tp is effective with a hysteresis produced by shifting lattice axes in a driving region-expanding direction with respect to each of two opposite directions of the engine driving parameters N and Tp as shown in FIG. 7A.

Figure 7B:
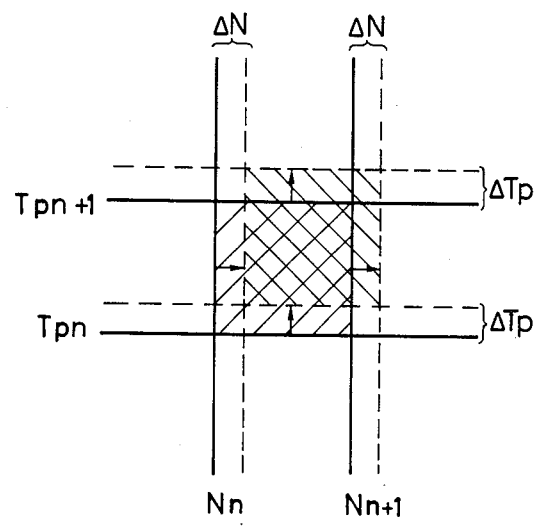
FIG. 7B is a memory map diagram illustrating another embodiment of the learning control system of the present invention.

If the actual engine rotation number N is compared with not $Nn-\Delta N$ but Nn at step 4 and the actual basic fuel injection quantity Tp is compared with not $Tpn-\Delta Tp$ but Tpn at step 12, judging the driving region is effective with a hysteresis produced by shifting lattice axes defining the upper limits of the engine rotation number N and the basic fuel injection quantity Tp to each increased value. This judgment is also effective so that the driving region expands with respect to each of increasing direction of N and Tp as shown in FIG. 7B.

As in case of the determination of the region N, the function of steps 15 and 16 corresponds to the driving state change direction judging means, and the function of steps 11 through 14, 17 and 18 corresponds to the driving region judging means.

Then, the routine goes to step 19, and by the region N decided at step 9 or 10 and the region Tp decided at step 17 or 18, the learning correction coefficient Kl stored in the driving region defined by lattice axes M and Tp is retrieved. This step 19 corresponds to the learning correction quantity retrieving means.

At step 20, the voltage correction value Ts is set based on the voltage of the battery 20.

At step 21, it is judged whether or not the condition is the $\lambda$ control condition.

In the case where the condition is not the $\lambda$ control condition, for example, in case of high-rotation high-load region, the routine goes to step 23 from step 22 in the state where the air-fuel ratio feedback correction coefficient $\alpha$ is clamped to the precedent value (or standard value of $\alpha 1$).

In case of the $\lambda$ control condition, at steps 22 through 24, the output voltage of the $O_2$ sensor 16 is compared with the slice level voltage and it is judged whether the air-fuel ratio is rich or lean, and the feedback correction coefficient $\alpha$ is set by integration control or proportional integration control. This portion corresponds to the feedback correction coefficient setting means. More specifically, in case of integration control, if by comparison at step 22, it is judged that the air-fuel ratio is rich, the feedback correction coefficient $\alpha$ is set by reducing a predetermined integration portion (I) from the preceding value at step 23. In contrast, if it is judged that the air-fuel ratio is lean, at step 24 the feedback correction coefficient $\alpha$ is set by adding the predetermined integration portion (I) to the preceding value. In case of proportional integration control, in addition to the above-mentioned control, at the time of rich-lean inversion, a predetermined proportional portion (P) larger than the integration proportion (I) is subtracted or added in the same direction as that of the integration portion (I).

Then, at step 25, a new learning correction coefficient Kl(new) is calculated by adding a predetermined proportion of the mean value $\overline{\Delta\alpha}$ of the deviation $\Delta\alpha$ of the feedback correction coefficient $\alpha$ from the standard value $\alpha^1$ retrieved at step 21 to the present learning correction coefficient Kl according to the formula of Kl(new)←Kl(old)+$\overline{\Delta\alpha}$/M (in which M is a constant larger than 1).

This step 25 corresponds to the learning correction quantity correcting means.

Then, at step 26, the fuel injection quantity Ti is calculated according to the equation of $Ti=Tp\times COEF\times Kl\times\alpha+Ts$. This portion corresponds to the control value computing means.

When the fuel injection quantity Ti is calculated, a driving pulse signal having a pulse width of Ti is putout at a predetermined timing synchronously with rotation of the engine and is given to the fuel injection valve 11 through the current waveform controlling circuit 41 to effect injection of the fuel.

In the above-mentioned control system, even if the engine rotation number N or base injection quantity Tp varies in the vicinity of lattice axes Nn and Tpn, since a certain hysteresis is produced in the size of lattice axes of the region where the learning correction coefficient Kl is retrieved according to the direction where such parameters change, hunting of the air-fuel ratio owing to the difference of Kl between adjacent learned and unlearned regions can be prevented and stable control characteristics can be obtained.

Furthermore, since a hysteresis is produced in the driving region-expanding direction with respect to directions of increase and decrease of the engine rotation number N and basic fuel injection quantity Tp, the center of the driving region where the learning correction coefficient Kl is stored is made in agreement with the center of the driving region expanded because of the above-mentioned hysteresis at the time of judgement of said region, and therefore, bad influences of the hysteresis on the learning capacity can be avoided and good learning control can be performed stably.

In the foregoing embodiment, the present invention is applied to the control of the air-fuel ratio. Of course, the present invention can be applied to the control of the idle rotation speed, the ignition time or the like.

Incidentally speaking, a control system in which in retrieving a learning correction quantity, the retrieved driving state is judged with a certain hysteresis produced in the direction in which the driving state is changed causes to eliminate a high degree of variations of the control state in the vicinity of the boundary between adjacent regions.

In this control system, as shown in FIG. 7B, the driving region is judged with a hysteresis produced in one direction in which the parameter of the engine driving state (such as the engine rotation number N or the basic injection quantity Tp), is changed, for example, in the direction where N or Tp is increased. However, control system as shown in FIG. 7B, with the lapse of time, an equivalent deviation can be brought about between the center of the driving region where learning is performed and the center of the region where correction is performed by using the learning correction coefficient of the judged driving region, and the inherent function of learning control can be obtained.

What is claimed is:

1. A learning and control apparatus for an electronically controlled internal combustion engine, comprising:
    means for detecting an actual value of a parameter of an object within the engine to provide a detected object parameter, said parameter to be controlled in accordance with a control value;
    means for detecting an engine driving state;
    basic control quantity setting means for setting a basic control quantity corresponding to a desired control value of the object;
    memory means for storing lattice axes driving the engine driving state detected by said detecting means into a plurality of regions in accordance with a parameter of the engine driving state and storing correction quantities for correcting said basic control quantity for each respective region defined by said lattice axes;
    learning correction quantity retrieving means for retrieving the stored correction quantity of each said corresponding region from said memory means based on the detected engine driving state of the engine;
    feedback correction quantity setting means for comparing said desired control value with the detected actual value of the detected object parameter and setting a feedback correction value by increasing or decreasing a feedback correction quantity by a predetermined quantity so that the actual value is brought close to the desired control value;
    control quantity computing means for computing a control quantity from (a) the basic control quantity set by said basic control quantity setting means, (b) the stored correction quantity retrieved by said learning correction quantity retrieving means and (c) the feedback correction quantity set by said feedback correction quantity setting means;
    control means responsive to said control quantity for controlling the object to be controlled;
    learning correction quantity correcting means for storing any deviation of the feedback correction quantity from a standard value and for correcting and rewriting the stored correction quantity corresponding to each region of the engine driving state in a direction to reduce the deviation;
    driving state change direction judging means for judging a direction of change of the parameter of the engine driving state; and
    driving region judging means for determining a driving region in which the stored correction quantity retrieved from the memory means by said learning correction quantity retrieving means is stored with a quantity of hysteresis such that at least one of the lattice axes defining said driving region is shifted by a predetermined value according to the direction of change of the parameter of the engine driving state.

2. An apparatus for determining and electronically controlling air-fuel ratio in an internal combustion engine comprising:
    means for detecting a driving state of the engine;
    first detecting means for detecting a flow quantity Q of air sucked into the engine;
    second detecting means for detecting an engine speed N;

third detecting means for detecting exhaust components of the engine and detecting an actual value of the air-fuel ratio in an air-fuel mixture sucked into the engine;

fuel injection means for injecting fuel according to a fuel injection quantity;

basic fuel injection quantity setting means for setting a basic fuel injection quantity corresponding to (a) a desired air-fuel ratio responsive to a flow quantity of air sucked into the engine detected by the first detecting means and (b) the engine speed N detected by the second detecting means;

memory means for storing lattice axes driving the engine state into a plurality of regions by parameters of the engine driving state N and Q and storing a correction coefficient Kl for correcting the basic fuel injection quantity for respective regions of the driving state of the engine defined by said lattice axes;

learning correction coefficient retrieving means for retrieving a stored correction coefficient Kl of a corresponding region from said memory means based on a detected driving state of the engine;

feedback correction coefficient setting means for comparing the detected air-fuel ratio detected by the third detecting means with the desired air-fuel ratio and setting a feedback correction coefficient $\alpha$ for correcting the basic fuel injection quantity by adjusting the feedback correction coefficient $\alpha$ by a predetermined quantity so that the actual air-fuel ratio is brought close to the desired air-fuel ration;

fuel injection quantity computing means for computing the fuel injection quantity based on (a) the basic fuel injection quantity computed by said basic fuel injection quantity computing means, (b) the stored correction coefficient Kl retrieved by the learning correction coefficient retrieving means and (c) the feedback correction coefficient $\alpha$ set by the feedback correction coefficient setting means;

control means operating according to said fuel injection quantity Tp to control said fuel injection means in an on-off manner by a driving pulse signal;

learning correction coefficient correcting means for determining a deviation $\Delta\alpha$ of the feedback correction coefficient $\alpha$ of each region of the driving state of the engine from a standard value $\alpha 1$ and correcting and rewriting the learning correction coefficient Kl corresponding to each region of an existing driving state of the engine in a direction reducing said deviation;

driving state change direction judging means for judging the direction of change of parameters N and Tp of the engine driving state; and driving region judging means for judging the driving region in which the learning correction coefficient Kl retrieved from the memory means by said learning correction coefficient retrieving means is stored with an amount of hysteresis such that at least one of the driving region-defining lattice axes is shifted in a direction responsive to a direction of change of the parameters N and Tp of the engine driving state.

3. A learning and control apparatus for an electronically controlled internal combustion engine as set forth claim 1, wherein said parameter to be controlled is amount of fuel injection from fuel injection means mounted on the engine which is opened and closed in an on-off manner by a driving pulse signal of said control means.

4. A learning and control apparatus for an electronically controlled internal combustion engine as set forth in claim 1, wherein said parameter to be controlled is an idle speed of said engine provided with an idle speed control valve in which said valve determines an amount of an opening of a passage bypassing a throttle valve arranged in an intake passage by minute oscillation in said amount of the opening in response to a driving pulse signal of said control means.

5. An apparatus for learning and electronically controlling air-fuel ratio as set forth claim 2, wherein said basic fuel injection quantity setting means sets the basic fuel injection quantity based on a basic injection pulse width Tp of opening of said fuel injection means given by the following equations: $Tp = K \times Q/N$.

6. An apparatus for learning and electronically controlling air-fuel ratio as set forth claim 5, wherein said fuel injection quantity computing means computes the fuel injection quantity based on an injection pulse width Ti of opening of said fuel injection means given by the following equations:

$$Ti = Tp \times COEF \times Kl \times \alpha + Ts$$

wherein Ts stands for the quantity of the voltage correction efficient for correcting the change of the voltage of a battery, COEF stands for coefficients for increasing the fuel injection quantity corresponding to the engine driving states.

7. An apparatus for learning and electronically controlling air-fuel ratio as set forth claim 6, wherein said learning correction coefficient correcting means computes a difference given by the following equations:

$$Kl \leftarrow Kl(old) + \overline{\Delta\alpha}/M \quad (M>1)$$

in which $\overline{\Delta\alpha}$ stands for a mean deviation of the feedback correction coefficient $\alpha$ from the standard value $\alpha 1$, M stands for a constant.

8. A learning and control apparatus for electronically controlled internal combustion engine as set forth claim 2, wherein said driving region judging means judges the driving region with a certain hysteresis produced by shifting a driving region-defining lattice axes in a driving region-expanding direction with respect to directions of change of the parameter of the engine driving state when the change of the parameter goes out from the existing driving region to one of the adjacent driving regions.

9. A learning and control apparatus for electronically controlled internal combustion engine as set forth claim 8, wherein said driving region-expanding direction is each of two opposite directions of change of the parameter of the engine driving state.

10. A learning and control apparatus for electronically controlled internal combustion engine as set forth claim 8, wherein said driving region-expanding direction is one of two opposite directions of change of the parameter of the engine driving state.

11. A learning and control apparatus for an electronically controlled internal combustion engine as set forth in claim 1, wherein said driving region judging means includes means for determining a driving region by setting the lattice axes of the driving state parameter at a position shifted by a predetermined quantity away from a reference position and in the same direction as a direction of change of said driving state parameter.

12. A learning and control apparatus for an electronically controlled internal combustion engine as set forth in claim 11, wherein said driving region judging means determines a driving region by setting the lattice axes of the driving state parameter at a position shifted by a predetermined quantity away from a reference position and in the same direction as a direction of change of the driving state parameter.

13. A learning and control apparatus for an electronically controlled internal combustion engine as set forth in claim 11, wherein said driving judging means determines a driving region by setting the lattice axes of the driving state parameter at a position shifted by a predetermined quantity away from a reference position and in the same direction as a direction of change of the driving state parameter when said direction of change is in a first direction and by setting the lattice axes of the driving state parameter at the reference position when said direction of change is in a second direction opposite to said first direction.

* * * * *

UNITED STATES PATENT AND TRADEMARK OFFICE
CERTIFICATE OF CORRECTION

PATENT NO.   :   4,763,627
DATED        :   August 16, 1988
INVENTOR(S)  :   Naoki Tomisawa It is certified that error appears in the above-identified patent and that said Letters Patent is hereby corrected as shown below:

On the title page, after "[22] Filed: June 30, 1986" the following should be inserted --[30]   Foreign Application Priority Data July 2, 1985 [JP]   Japan     60-143896
    Nov. 6, 1985 [JP]   Japan     60-246955--.

Signed and Sealed this

Twentieth Day of December, 1988

Attest:

DONALD J. QUIGG

Attesting Officer

Commissioner of Patents and Trademarks